United States Patent
Glover et al.

(10) Patent No.: US 6,923,206 B2
(45) Date of Patent: Aug. 2, 2005

(54) EXCESS FLOW VALVE WITH MAGNET

(75) Inventors: Donald S. Glover, Birmingham, MI (US); James Scanlon, Novi, MI (US); Klein Michael, Ann Arbor, MI (US); Mark Koeroghlian, Austin, TX (US)

(73) Assignee: Brass Craft Manufacturing Company, Novi, MI (US)

( * ) Notice: Subject to any disclaimer, the term of this patent is extended or adjusted under 35 U.S.C. 154(b) by 107 days.

(21) Appl. No.: 10/281,901

(22) Filed: Oct. 28, 2002

(65) Prior Publication Data

US 2004/0079911 A1 Apr. 29, 2004

(51) Int. Cl.⁷ .......................... F16K 17/28; F16K 31/08
(52) U.S. Cl. ................. 137/517; 137/454.2; 137/515.5; 251/65
(58) Field of Search .............................. 137/460, 517, 137/515.5, 515.7, 454.2; 251/65

(56) References Cited

U.S. PATENT DOCUMENTS

| | | | |
|---|---|---|---|
| 2,215,044 A | | 9/1940 | Kammerdiner |
| 2,569,316 A | | 9/1951 | Jerman |
| 2,585,316 A | | 2/1952 | Hobson |
| 2,646,071 A | | 7/1953 | Wagner |
| 2,667,895 A | * | 2/1954 | Pool et al. ............... 251/65 |
| 2,736,331 A | * | 2/1956 | Seeler .................. 251/65 |
| 2,949,931 A | | 8/1960 | Ruppright |
| 3,087,761 A | | 4/1963 | Stelzer |
| 3,471,091 A | | 10/1969 | Baker |
| 3,540,438 A | | 11/1970 | Jacuzzi, et al. |
| 3,747,616 A | | 7/1973 | Lloyd |
| 3,779,262 A | | 12/1973 | Manning et al. |
| 3,797,520 A | * | 3/1974 | Lekarski et al. ............ 137/517 |
| 3,835,846 A | | 9/1974 | Kurtz |
| 4,212,313 A | | 7/1980 | Winters |
| 4,220,145 A | | 9/1980 | Stamp et al. |
| 4,245,814 A | | 1/1981 | Shimizu |
| 4,256,277 A | | 3/1981 | Embree |
| 4,257,443 A | | 3/1981 | Turney |
| 4,257,444 A | | 3/1981 | Ogle, Jr. et al. |
| 4,349,923 A | | 9/1982 | Chalberg |
| 4,382,449 A | | 5/1983 | Nelson |
| 4,485,832 A | | 12/1984 | Plemmons et al. |
| 4,512,934 A | | 4/1985 | Bucher |
| 4,541,780 A | | 9/1985 | Moreland |
| 4,565,208 A | | 1/1986 | Ritchie et al. |
| 4,607,400 A | | 8/1986 | Goodman |
| 4,640,303 A | | 2/1987 | Greenberg |
| 4,715,394 A | | 12/1987 | O'Donnell et al. |
| 4,764,046 A | | 8/1988 | Kitamura et al. |
| 4,785,842 A | | 11/1988 | Johnson, Jr. |
| 4,844,113 A | | 7/1989 | Jones |
| 4,853,987 A | | 8/1989 | Jaworski |
| 4,856,125 A | | 8/1989 | Dijkhuizen |
| 4,874,012 A | | 10/1989 | Velie |
| 4,883,081 A | | 11/1989 | Morris |
| 4,901,926 A | | 2/1990 | Klotzbach |
| 4,960,146 A | | 10/1990 | Morris |

(Continued)

FOREIGN PATENT DOCUMENTS

| | | |
|---|---|---|
| CA | 1321991 | 9/1993 |
| WO | WO98/51948 | 11/1998 |

*Primary Examiner*—John Rivell
(74) *Attorney, Agent, or Firm*—Carlson, Gaskey & Olds

(57) ABSTRACT

A number of improved excess flow valves are disclosed wherein pressure drop is optimized through the device to maximize efficiency while minimizing shut-off flow rates. Flow restrictions are minimized throughout the valve structure and maximized across a valve closure plate, eliminating flow restriction variations caused by orientation of the valve components. A magnet having radially opposing poles optimizes the magnet's attractive force relationship with the valve plate.

22 Claims, 4 Drawing Sheets

U.S. PATENT DOCUMENTS

| | | |
|---|---|---|
| 4,965,893 A | 10/1990 | Henkin et al. |
| 4,982,459 A | 1/1991 | Henkin et al. |
| 4,993,451 A | 2/1991 | Kremer |
| 5,010,916 A | 4/1991 | Albrecht |
| 5,029,601 A | 7/1991 | Reschke et al. |
| 5,052,429 A | 10/1991 | Yoo |
| 5,063,620 A | 11/1991 | Mersmann |
| 5,074,327 A | 12/1991 | Reid |
| 5,119,841 A | 6/1992 | McGill |
| 5,203,365 A | 4/1993 | Velie |
| 5,209,454 A | 5/1993 | Engdahl et al. |
| 5,265,286 A | 11/1993 | Filipponi |
| 5,326,474 A | 7/1994 | Adams et al. |
| 5,335,376 A | 8/1994 | Kaldewei |
| 5,409,031 A | 4/1995 | McGill et al. |
| 5,414,878 A | 5/1995 | Booth |
| 5,495,627 A | 3/1996 | Leaverton et al. |
| 5,582,201 A | 12/1996 | Lee et al. |
| 5,587,023 A | 12/1996 | Booth |
| 5,603,345 A | 2/1997 | Franklin et al. |
| 5,704,385 A | 1/1998 | McGill et al. |
| 5,755,259 A | 5/1998 | Schulze et al. |
| 5,799,681 A | 9/1998 | Velie et al. |
| 5,866,802 A | 2/1999 | Kimata et al. |
| 5,927,314 A | 7/1999 | Velie et al. |
| 6,019,115 A | 2/2000 | Sanders |
| 6,488,047 B1 * | 12/2002 | Glover et al. ............... 137/517 |

* cited by examiner

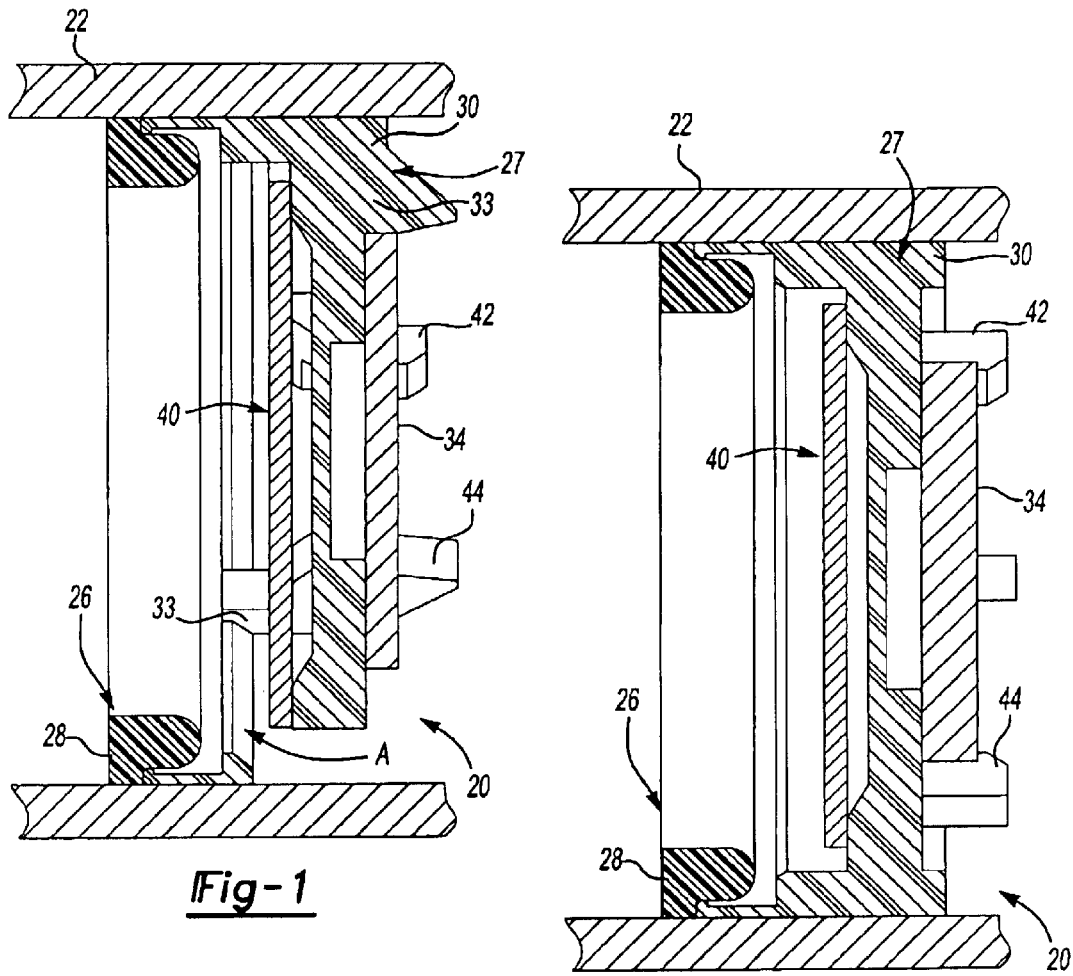
Fig-1
Fig-2
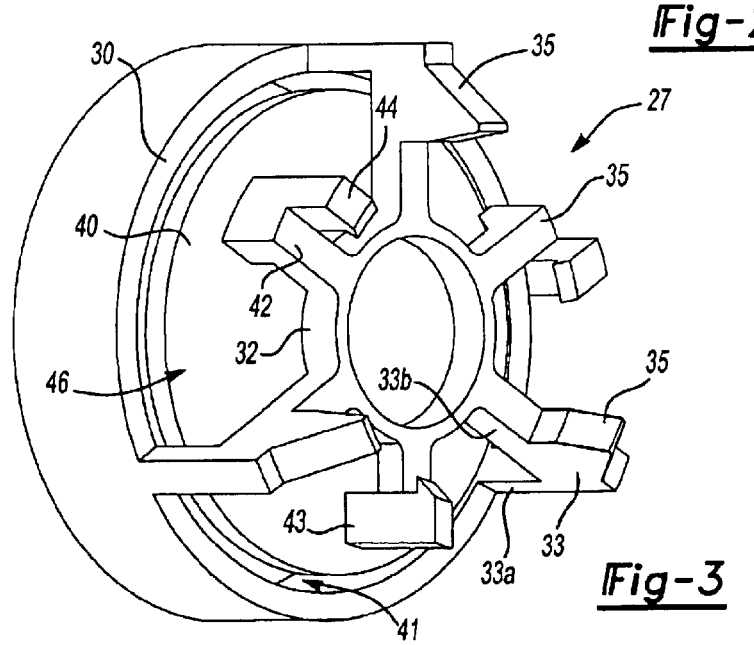
Fig-3

EXCESS FLOW VALVE WITH MAGNET

BACKGROUND OF THE INVENTION

This invention relates to excess flow valves for controlling flow through a conduit and more particularly to an excess flow valve that minimizes pressure drops within the valve through a simplified valve construction.

Excess flow valves are utilized to limit the amount of fluid flow through a conduit. Generally, some way of holding the valve in a generally open position maintains the valve in an open position, allowing flow through the conduit if the flow rate through the conduit is below a predetermined limit. If the flow rate increases causing the pressure drop across the valve to exceed a certain value, then the valve is moved to a closed position restricting flow through the conduit.

One type of excess flow valve uses a magnet to hold the valve at a generally open position. The typical prior art magnetic excess flow valve has been incorporated into a capsule, wherein the entire structure for providing a valve seat, a valve guide, and a magnet holder are all incorporated as a single capsule item. Ideally, any pressure drops across the valve will help close the valve. Prior art valve structures are inefficient, however, because the structures often interfere with fluid flow through the valve, causing excessive pressure drops that do not aid in closing the valve. Further, even though magnets should have sufficient force to re-open a closed valve, current magnet structures may not always have force characteristics that also allow the attractive force to be minimized in the open position to improve the sensitivity of the valve plate for valve closing.

In addition, prior art valves have had non-symmetric structures, making valve operation dependent on the orientation between valve components. This causes the pressure drop required to close the valve to be, undesirably, a function of both the valve's component orientation and the flow rate rather than a function of the flow rate alone. When fluid pressure drops are a function of the orientation of components within the valve as well as fluid flow, the valve operation becomes unpredictable.

There is a desire for an excess flow valve structure that does not interfere with fluid flow and responds accurately and consistently to fluid pressure drops in a conduit.

There is also a desire for an excess flow valve structure that optimizes pressure drops to maximum valve efficiency while still maintaining a desired valve closure flow rate.

SUMMARY OF THE INVENTION

Accordingly, one embodiment of the invention is directed to a simplified excess flow valve structure that improves the efficiency of valve operation by ensuring that any pressure drops across the valve aid closing of the valve. This is achieved by reducing the number of valve parts, minimizing flow restrictions through the conduit due to the valve assembly to the extent possible when the valve is open. In one embodiment, a valve body portion incorporating a valve guide and a magnet holder is separate from the valve seat. In some embodiments the valve seat may be provided by a separate valve seat component, and in other embodiments the valve seat is integrated into a conduit structure.

In another embodiment, the valve is mounted at an interface between two conduit portions. In this embodiment, there is less structure at the outer periphery of the valve to disrupt or otherwise restrict fluid flow. The excess flow valve allows fluid to flow around the outer periphery of the valve plate when the valve plate in the valve is in its open position. The inventive structure therefore avoids fluid flow obstacles that cause unnecessary pressure drops in the valve. In a further embodiment, the valve has a disk-shaped magnet rather than a cylindrical magnet, improving the force characteristics of the magnet and minimizing the attractive force in the open position to improve the sensitivity of the valve plate for valve closing.

By minimizing undesirable flow restrictions in the valve, the inventive structure improves valve efficiency, allowing a minimal valve size for a desired flow rate. The inventive structure also eliminates orientation-specific flow restrictions, ensuring that fluid pressure drops through the valve are caused only by the flow rate and not component orientation, thereby providing consistent efficiency and valve closure flow rates.

BRIEF DESCRIPTION OF THE DRAWINGS

FIG. 1 is a section view taken along line 1–1' of one embodiment of the inventive valve as shown in FIG. 4.

FIG. 2 is a compound section view taken along line 2–2' in FIG. 4.

FIG. 3 is a perspective view of the valve shown in FIG. 1.

DETAILED DESCRIPTION OF THE EMBODIMENTS

Figure 4:
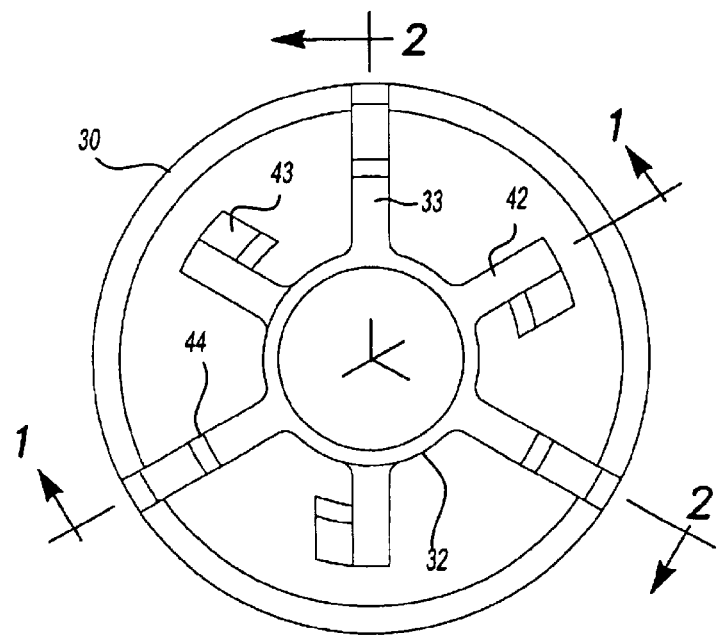
FIG. 4 is plan view of the valve shown in FIGS. 1 and 2.

Referring to FIGS. 1 through 4, an excess flow valve 20 is positioned within a conduit 22. In this embodiment, a valve seat component 26 is provided as a separate element from a valve body 27 in the excess flow valve 20. The valve seat 26 may be made of a resilient material to create a fluid-tight seal. An outer surface 28 of the valve seat 26 engages the inner surface of the conduit 22. An outer peripheral portion 30 of the valve body 27 is ring-shaped and also engages the inner surface of the conduit 22. The valve body 27 in this embodiment also includes an inner hub 32 supported by a first set of arms 33 extending between the outer peripheral portion 30 and the inner hub 32. In one embodiment, the arms have a axial portion 33a and a radial portion 33b. Guide protrusions 35 on the arms 33 form a magnet retention structure to hold a magnet 34, preferably a disk-shaped magnet. Note that the inner hub 32 is an optional structure; if the inner hub 32 is eliminated, the arms 33 may intersect somewhere inside the boundaries of the outer peripheral portion 30 at a central point. Alternatively, the arms 33 may be linked to each other in some other fashion. The arms 33 may also not contact each other at all and be attached only to the outer peripheral portion 30. The arms 33 may also be configured so that they cannot open out in a radial direction, ensuring that the magnet 34 is retained firmly in the valve 20.

A disk-shaped valve plate 40 is movable between an open position, where the valve plate 40 moves toward the magnet 34, and a closed position, where the valve plate moves toward the valve seat 26 to close the conduit 22. FIGS. 1 through 3 show the valve plate 40 in an open position. The circumferential edge of the valve plate 40 and the inside surface of the conduit 30 form a fluid path (shown in FIG. 1 by arrow A) that is unobstructed by any portion of the valve body 27 when the valve plate 40 is in the open position. As shown in the Figures, the plate 40 sits slightly upstream of the outer peripheral portion 30 while still being guided by the axial portion 33a of the arms 33 when in the open position, leaving a gap 41 through which fluid can flow easily between the plate 40 and the conduit 22. Although the arms 33 do act as a minor obstacle in the fluid path, the effect of the arms 33 on fluid flow is minimal because the circumference of the valve plate 40 is otherwise free, without any portion of the valve body 27 surrounding the plate 40 when the plate 40 is in the open position.

The disk-shaped valve plate 40 is preferably symmetrical so that the valve plate's 40 orientation with respect to the hub 32 and arms 33 does not affect the fluid flow through the conduit 22. In one embodiment, the arms 33 act as a guide for the valve plate 40 as well as a magnet holder, eliminating the need for separate guiding structures on the valve plate 40 itself.

As noted above, the first set of arms 33 connect the outer peripheral portion 30 of the valve 20 with the inner hub 32. One embodiment of the inventive valve structure 20 may also include an optional second set of arms 42 that extend outwardly and radially from the inner hub 32 and end between the inner hub 32 and the outer peripheral portion 30. The additional arms 42 distribute additional contact points to guide the valve plate 40 while still minimizing the total contact surface between the plate 40 and the arms 33, 42, preventing the plate 40 from being stuck in a tilted position (e.g., with one portion of the plate 40 lying farther upstream than other portions of the plate 40) within the valve body 27. In one embodiment, the first and second arms 33, 42 alternate around the inner hub 32 to distribute the contact points evenly on the plate 40. Further, because the arms 33, 42 are arranged to minimize the area of the plate 40 contacting the arms 33, 42, the inventive structure maximizes the area of the plate 40 facing the upstream side of the conduit 22.

To minimize the contact between the valve plate 40 and the arms 33, 42, contact pads 43 may be formed in either or both sets of arms 33, 42. The pads 43 extend slightly from the arms 33, 42 and act as point contacts on the plate 40 surface. Alternatively, the arms 33 themselves may extend upstream and emanate inwardly from the outer peripheral portion 30 of the valve body 27 to form contact pads 43 at the point where the outer peripheral portion 30 and the arms 33 join. Regardless of the pad 43 structure, the pads 43 minimize contact between the plate 40 and the arms 33, 42 or any other portion of the valve body 27. In one embodiment, the pads 43 contact less than 10%, and preferably around 2%, of the plate 40 surface.

To hold the magnet 34 more securely, the valve body 27 may include a magnet retention structure that positions the magnet 34 upstream of the valve plate 40. In one embodiment, one or more of the arms 33, 42 may include a clip portion 44 to form the magnet retention structure. The magnet 34 may then be engaged with the clip portions 44 during valve assembly. The thin profile of the disk-shaped magnet 34 allows it to be held firmly in the valve 20 without requiring bulky attachment structures that would interfere with fluid flow. In the illustrated embodiments, the clip portions 44 are placed on the second set of arms 42, but they may also be formed on first set of arms 33 instead of or in addition to the guide protrusions 35.

Shaping the magnet 34 into a disk rather than a cylinder further reduces the amount of space that the valve 20 occupies in the conduit 22. The clip portions 44 create a positive engagement between the arms 33, 42 and the magnet 34, ensuring that the magnet 34 will not be partially inserted or jarred out of position during shipping.

Figure 8:
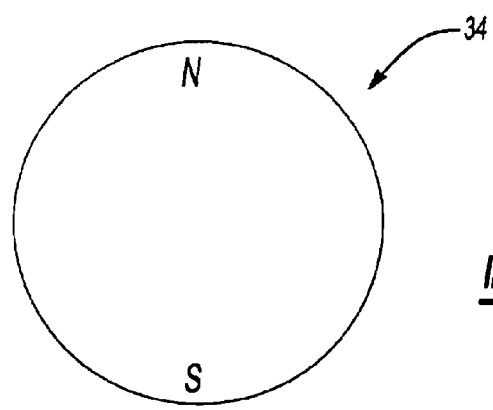
FIG. 8 is a representative diagram of a magnet according to one embodiment of the invention.

The magnet 34 is preferably magnetized across a face surface 46 of the magnet 34 (i.e., wherein the poles lie radially opposite each other), as shown in FIG. 8, rather than magnetized parallel to the fluid flow because the thin profile of the magnet 34 makes magnetizing in the axial direction impractical. In other words, the north and south poles of the magnet 34 would each be on the outer perimeter of the face surface 46 across from each other. A disk-shaped magnet has a more desirable force characteristic than a cylindrical magnet due to the disk-shaped magnet's greater diameter-to-thickness ratio. This improved force characteristic provides a more constant magnet force attracting the valve plate 40 as it travels between the open and closed positions. To control the overall magnet strength after selecting the optimal magnet shape, inert material may be added into the magnet 34.

Note that the magnet 34 does not necessarily have to be disk-shaped; any magnet 34 having radially opposed poles will have characteristics that are advantageous in the inventive structure. For example, the magnet 34 may be shaped as a cylinder, but magnetized with radially opposed poles. The magnet 34 may also be formed in an annular shape by forming a hole in the center of the disk-shaped magnet 34 to provide an additional fluid flow path through the middle of the valve 20. Regardless of the actual magnet shape, the radially opposed poles provide improved force characteristics over magnets that are magnetized parallel to fluid flow.

Figure 5:
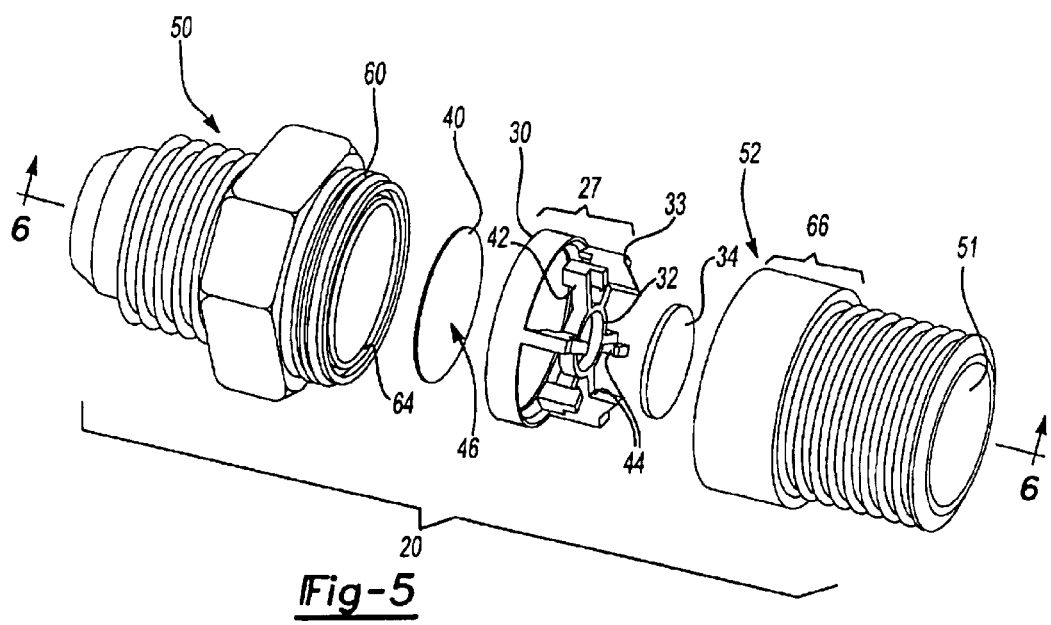
FIG. 5 illustrates another embodiment of the invention having a valve seating structure integrated into a conduit.
Figure 6:
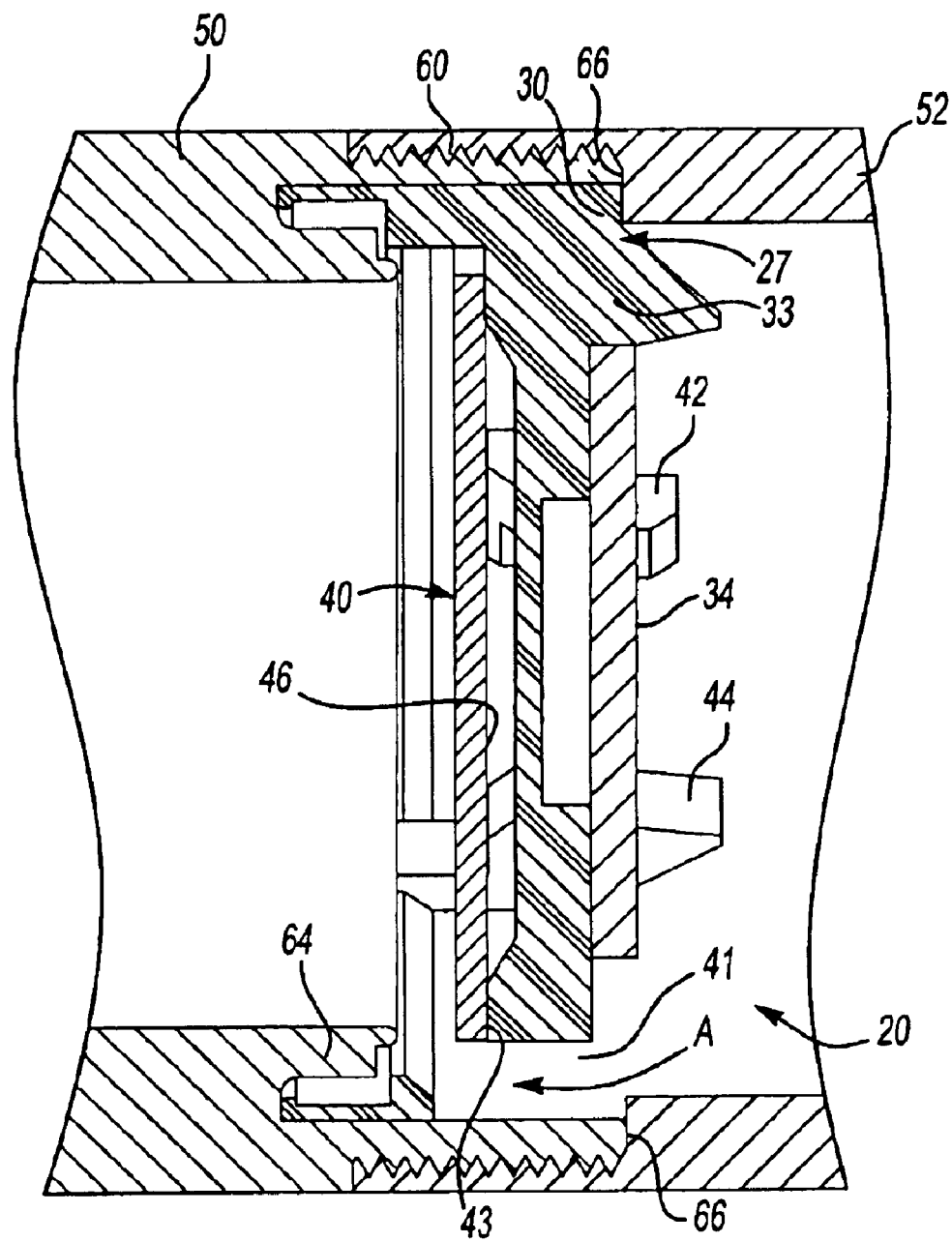
FIG. 6 is a sectional view of the invention shown in FIG. 5.

FIG. 5 is an exploded view illustrating one embodiment of the excess flow valve 20 incorporated into a two-piece conduit, while FIG. 6 is a section view taken along line 6–6' of FIG. 5. First and second conduit portions 50, 52 are coupled together via a threaded connection 60 and a valve seat 64 is formed as an integral part of the conduit 22 rather than a separate component. An opposed end surface 66 of the second conduit portion 52 captures the valve body 27. While the valve 20 is shown axially captured in the figure, the outer periphery of the valve body 27 could also be formed to be an interference fit within the conduit 22.

The valve body 27 holds the magnet 34 adjacent the valve plate 40. As shown in FIG. 6, the valve body 27 does not have material disposed around its entire circumference to hold the magnet 34 and guide the valve plate 40. Instead, as noted above, the first and second sets of arms 33, 42 are circumferentially spaced to reduce resistance to fluid flow past the valve 20.

Figure 7:
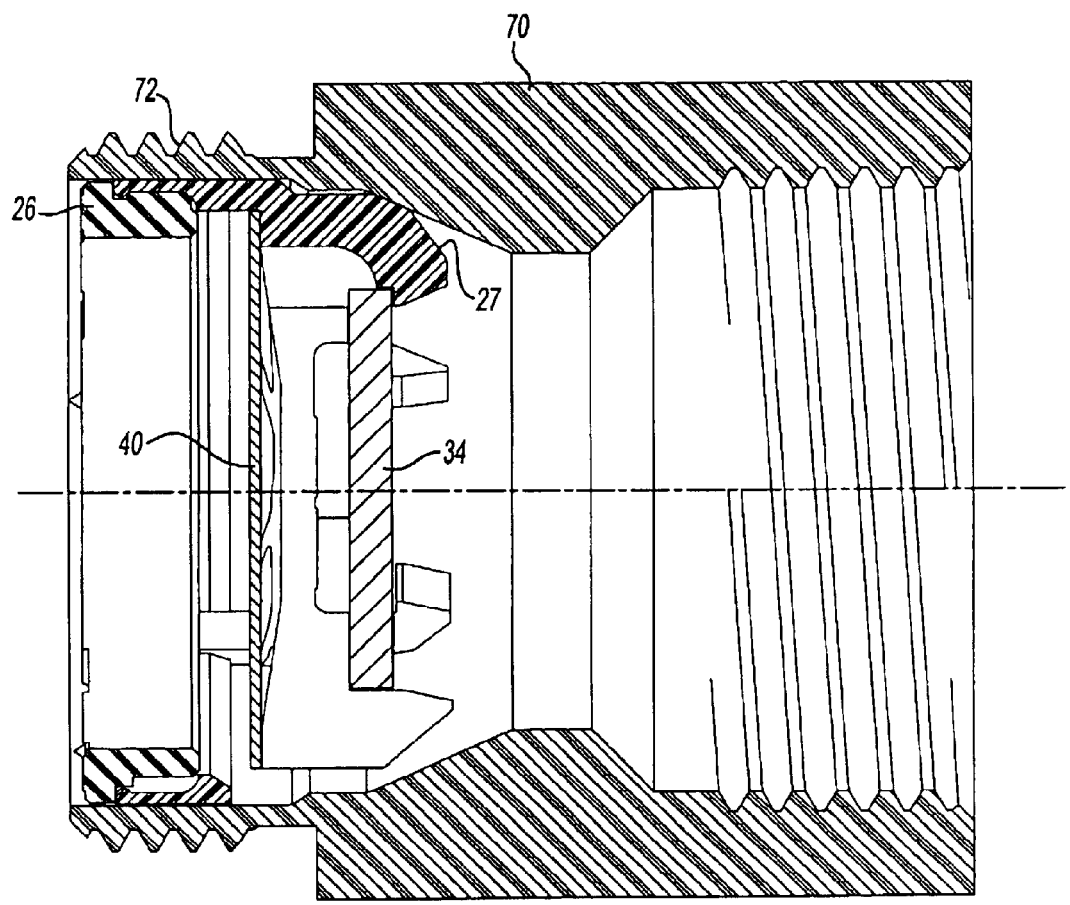
FIG. 7 is a sectional view of yet another embodiment of the present invention.

FIG. 7 illustrates another embodiment of the present invention. In this embodiment, the excess flow valve 20 is designed to fit inside a conduit 70 having a threaded area 72 at the end of the conduit 70 such that the valve seat 26 terminates at or near the end of the threaded area 72.

Although the valve structure focuses on guiding the valve plate 40 and supporting the magnet 34 with arms, other valve plate guide and/or support structures may be incorporated into the valve body 27 without departing from the scope of the invention.

As a result, the inventive structure improves valve operation by incorporating a disk-shaped magnet in the valve and a disk-shaped valve plate that is guided by the valve body instead of protrusions on the valve plate itself. Further, the outer peripheral portion is formed on the valve body so that the circumference of the valve plate is not enclosed by the outer peripheral portion when the valve plate is in the open position, leaving the valve plate edge exposed to form a fluid path defined by the valve plate and the inside surface of the fluid conduit instead of the valve plate and the valve body.

By minimizing fluid path obstructions, minimizing contact between the valve plate and the valve body, and taking advantage of the force characteristics of the disk-shaped magnet, the inventive excess flow valve offers improved valve efficiency.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An excess flow valve for a conduit, comprising:
    a valve body comprising
        an outer peripheral portion, a plurality of arms connected to the outer peripheral portion, and a magnet retention structure;
    a magnet held in the magnet retention structure, wherein the magnet has radially opposed poles, wherein the magnet is disk shaped;
    a valve plate movable between an open position and a closed position; and
    a valve seat, wherein the valve plate contacts the valve seat in the closed position and wherein the valve plate has a circumferential edge, and wherein the valve plate is disposed upstream of the outer peripheral portion in the open position such that a fluid path is defined by an inner surface of the conduit and the circumferential edge of the valve plate.

2. The excess flow valve of claim ,1 wherein the magnet retention structure comprises a plurality of guide protrusions extending from said arms.

3. The excess flow valve of claim 2, wherein the magnet retention structure further comprises a clip portion disposed on at least one of said plurality of guide protrusions that hold said magnet.

4. An excess flow valve for a conduit, comprising: a valve body comprising an outer peripheral portion, a plurality of arms connected to the outer peripheral portion,and a magnet retention structure; a magnet held in the magnet retention structure, wherein the magnet has radially opposed poles, wherein the magnet is disk shaped; a valve plate movable between an open position and a closed position; and a valve seat, wherein the valve plate contacts the valve seat in the closed position and wherein the valve body further comprises at least one contact pad that contacts the valve plate when the valve plate is in the open position.

5. The excess flow valve of claim 4, wherein said at least one contact pad is formed as a protrusion connected to said plurality of arms.

6. The excess flow valve of claim 4, wherein said at least one contact pad comprises a plurality of contact pads, and wherein said plurality of contact pads together contact less than 10% of a surface of the valve plate.

7. The excess flow valve of claim 4, wherein said at least one contact pad comprises at least three contact pads.

8. The excess flow valve of claim 4, wherein said plurality of arms extend upstream and emanate inwardly from the outer peripheral portion to form said at least one contact pad at the point said plurality of arms join the outer peripheral portion.

9. An excess flow valve for a conduit, comprising:
    a valve body comprising an outer peripheral portion, a plurality of arms connected to the outer peripheral portion, and a magnet retention structure;
    a magnet held in the magnet retention structure;
    a valve plate movable between an open position and a closed position, the valve plate having an edge; and
    a valve seat, wherein the valve plate contacts the valve seat in the closed position and is disposed upstream of the outer peripheral portion in the open position such that a fluid path is defined by an inner surface of the conduit and the edge of the valve plate.

10. The excess flow valve of claim 9, wherein the magnet has radially opposed poles.

11. The excess flow valve of claim 9, further comprising a plurality of contact pads that contact the valve plate when the valve plate is in the open position.

12. The excess flow valve of claim 11, wherein the plurality of contact pads are formed as protrusions extending from said plurality of arms.

13. The excess flow valve of claim 11, wherein said plurality of arms extend upstream and emanate inwardly from the outer peripheral portion to form contact pads at the point said plurality of arms join the outer peripheral portion.

14. The excess flow valve of claim 11, wherein said plurality of contact pads together contact less than 10% of a surface of the valve plate.

15. The excess flow valve of claim 9, wherein the magnet is disk shaped.

16. The excess flow valve of claim 9, wherein the magnet is annular.

17. The excess flow valve of claim 9, wherein the magnet retention structure comprises a plurality of guide protrusions extending from said arms.

18. The excess flow valve of claim 17, wherein the magnet retention structure further comprises a clip portion disposed on at least one of said plurality of guide protrusions that hold said magnet.

19. A fluid flow control system, comprising:
    a conduit;
    a valve body comprising an outer peripheral portion, a plurality of arms connected to the outer peripheral portion, and a magnet retention structure;
    a magnet held in the magnet retention structure, wherein the magnet has radially opposed poles;
    a valve plate movable between an open position and a closed position, the valve plate having an edge; and
    a valve seat, wherein the valve plate contacts the valve seat in the closed position and is disposed upstream of the outer peripheral portion in the open position such that a fluid path is defined by an inner surface of the conduit and the edge of the valve plate.

20. The fluid flow control system of claim 19, wherein the valve seat is a surface in an inner portion of the conduit.

21. The fluid flow control system of claim 19, wherein the valve seat is disposed such that it terminates substantially at an end of a conduit section.

22. An excess flow valve for a conduit, comprising:
    a valve body comprising an outer peripheral portion, a plurality of arms connected to the outer peripheral portion, and a magnet retention structure;
    a magnet held in the magnet retention structure, wherein the magnet has radially opposed poles that are substantially perpendicular to a direction of fluid flow through the excess flow valve;
    a valve plate movable between an open position and a closed position; and
    a valve seat, wherein the valve plate contacts the valve seat in the closed position and is disposed upstream of the outer peripheral portion in the open position such that a fluid path is defined by an inner surface of the conduit and the edge of the valve plate.

* * * * *

UNITED STATES PATENT AND TRADEMARK OFFICE
CERTIFICATE OF CORRECTION

PATENT NO. : 6,923,206 B2 Page 1 of 1
DATED : August 2, 2005
INVENTOR(S) : Glover et al.

It is certified that error appears in the above-identified patent and that said Letters Patent is hereby corrected as shown below:

<u>Title page,</u>
Item [75], Inventors, "Klein Michael" should read as -- Michael Klein --.

Signed and Sealed this

Twenty-fifth Day of October, 2005

JON W. DUDAS
*Director of the United States Patent and Trademark Office*